(12) United States Patent
Wang

(10) Patent No.: US 11,120,810 B2
(45) Date of Patent: Sep. 14, 2021

(54) RECORDING DEVICE

(71) Applicant: Yi-Jou Wang, New Taipei (TW)

(72) Inventor: Yi-Jou Wang, New Taipei (TW)

(73) Assignees: Yi-Jou Wang, New Taipei (TW); Yi-Chung Chang, New Taipei (TW)

(\*) Notice: Subject to any disclaimer, the term of this patent is extended or adjusted under 35 U.S.C. 154(b) by 25 days.

(21) Appl. No.: 16/703,734

(22) Filed: Dec. 4, 2019

(65) Prior Publication Data
US 2020/0184984 A1    Jun. 11, 2020

(30) Foreign Application Priority Data

Dec. 6, 2018 (TW) ................................ 107143971

(51) Int. Cl.
*G10L 19/22* (2013.01)
*G10L 19/16* (2013.01)
*G10L 25/60* (2013.01)

(52) U.S. Cl.
CPC ............ *G10L 19/22* (2013.01); *G10L 19/167* (2013.01); *G10L 25/60* (2013.01)

(58) Field of Classification Search
None
See application file for complete search history.

(56) References Cited

FOREIGN PATENT DOCUMENTS

CN    105551517 A  *  5/2016
KR    20170002245 A  *  1/2017

\* cited by examiner

*Primary Examiner* — Richa Mishra
(74) *Attorney, Agent, or Firm* — Che-Yang Chen; Law Office of Michael Chen

(57) ABSTRACT

A recording device comprises a first transmission unit, a switching and control unit, a sound quality sampling and encoding-decoding unit, a second transmission unit, a data access unit, a data writing unit, and a memory unit. A first digital audio source signal of an electronic device is transmitted from the first transmission unit to the switching and control unit. The sound quality sampling and encoding-decoding unit is electrically connected to the switching and control unit, receives and converts the aforementioned signal into a first digital audio signal and a first analog audio source signal. A second analog audio source signal of an audio receiving and transmitting device is converted into a second digital audio signal by the sound quality sampling and encoding-decoding unit. The data writing unit receives the first and second digital audio signals and writes the first and second digital audio signals into the memory unit.

10 Claims, 9 Drawing Sheets

RECORDING DEVICE

BACKGROUND OF THE INVENTION

Field of Invention

The present invention relates to a recording device capable of selecting recording or data accessing according to requirements, and being convenient to carry and capable of saving resources for developing application programs.

Related Art

With the advancement of communication technology, services or business activities provided by various application communication devices are becoming more and more popular, and network communication applications for conference call between two parties and multi-parties are becoming more and more popular. In the process of contacting or confirming matters, telephone recording is a simple, convenient and indispensable means of attesting and recording, and especially the use of electronic devices such as mobile phones, tablet computers, laptops or computers has become more and more popular. When electronic devices are used in general situations, recording of the conversation content is often inconvenient for users due to the occasion in which electronic devices are used. There are even circumstances that the record is kept by handwriting or other methods while key points of the conversation may be neglected. For example, during walking or driving, if there is a need to record important information, it is extremely dangerous for users of electronic devices to pause randomly and to record by writing with both hands during traveling. Currently, there are many systems that can perform recording of calls that are done through electronic devices, analog signals are mainly outputted through the earphone jack, and the calls made through network communication applications cannot be directly recorded. Besides, there are phenomena of sound source distortion or sound interruption, and transmission is also limited to wired transmission. There is no portable and convenient recording device developed for the market that can directly record calls made through network communication applications. If recording is required, it is necessary to install an application or to amplify and hold a recording device for recording, which is quite inconvenient in recording and carrying. If electronic devices are used to record calls made through network communication applications, a recording program needs to be developed for the specific network communication application, but the recording program needs to be correspondingly developed for the program code of the network communication application, which is a costly and difficult method. Development kit or application interface for the network communication application may not be opened to provide for external developers to develop functions for the application. The existing analog audio source recording is usually an analog audio source signal outputted directly from the earphone jack of an electronic device or the USB audio output of the electronic device is directly converted to an analog audio source signal for recording. It is easy for analog audio source recording to have the following disadvantages:

1. Easy to distort and need to match.
2. Easy to be interfered.
3. It is easy to lose sound or miss seconds of sound.
4. The volume of sound cannot be balanced, and it is easy to have sudden loud or low volume.

Therefore, how to improve the above-mentioned drawbacks and problems is the technical difficulty that the inventor of the present invention wants to solve.

SUMMARY OF THE INVENTION

In order to effectively solve the above problems, a main object of the present invention is to provide a digital recording device capable of selecting recording or data accessing according to requirements, and being convenient to carry and capable of saving resources for developing application programs.

In order to achieve the above objects, the present invention provides a recording device comprising: a first transmission unit, a switching and control unit, a sound quality sampling and encoding-decoding unit, a second transmission unit, a data access unit, a data writing unit, and a memory unit. Wherein the first transmission unit is connected to at least one electronic device by wire or wirelessly, and the second transmission unit is connected to at least one audio receiving and transmitting device for making a call and recording by wire or wirelessly. During the call and recording by the recording device, the electronic device generates a first digital audio source signal and transmits the first digital audio source signal to the first transmission unit, and the first transmission unit receives the first digital audio source signal and transmits the first digital audio source signal to the sound quality sampling and encoding-decoding unit. At the same time, a second analog audio source signal generated by an audio receiving and transmitting unit is transmitted to the second transmission unit, and the second transmission unit receives the second analog audio source signal and transmits the second analog audio source signal to the sound quality sampling and encoding-decoding unit. The sound quality sampling and encoding-decoding unit samples sound quality of the first digital audio source signal and the second analog audio source signal, and the sound quality sampling and encoding-decoding unit is capable of effectively avoiding distortion and producing high-resolution sound quality. The sound quality sampling and encoding-decoding unit converts the sampled first digital audio source signal into a first digital audio signal (I2S signal) and a first analog audio source signal, and the sound quality sampling and encoding-decoding unit converts the second analog audio source signal into a sampled second digital audio signal (I2S signal) and a second digital audio source signal. At this time, if a user has not turned on a recording function, it is generally an audio source conversion output mode. The user can turn on or off the recording function by a switch for starting and ending recording, when the switch for starting and ending recording is detected to be turned on to start the recording function, the sound quality sampling and encoding-decoding unit transmits the converted first digital audio signal (I2S signal) and the second digital audio signal (I2S signal) to the data writing unit. The data writing unit merges the first digital audio signal (I2S signal) and the second digital audio signal (I2S signal) into a digital data to be stored in the memory unit. Until the switch for starting and ending recording sends out a message of ending recording, a device function switching unit controls and switches to a memory reading mode to access data of the memory unit through the data access unit, thereby achieving efficacies of the recording device capable of selecting recording or data accessing according to requirements, and being convenient to carry and capable of saving resources for developing application programs.

According to one embodiment of the recording device of the present invention, wherein the second transmission unit receives the first analog audio source signal and transmits the first analog audio source signal to the audio receiving and transmitting device, and the second transmission unit is also capable of receiving the second analog audio source signal from the audio receiving and transmitting device and transmitting the second analog audio source signal to the sound quality sampling and encoding-decoding unit to be converted into the second digital audio source signal (the wired connection mode is USB Audio serial bus digital audio source signal, and the wireless connection mode is Bluetooth Audio Profile digital audio source signal), and transmitting the second digital audio source signal to the first transmission unit and then transmitting to the electronic device.

According to one embodiment of the recording device of the present invention, further includes a switch for starting and ending recording, the switch for starting and ending recording is electrically connected to the sound quality sampling and encoding-decoding unit, the sound quality sampling and encoding-decoding unit receives a turn on or turn off message of the switch for starting and ending recording, and sends out a command of storing or ending storing to the data writing unit. The data writing unit integrates the first digital audio signal (I2S signal) and the second digital audio signal (I2S signal) into a digital data to be stored in the memory unit.

According to one embodiment of the recording device of the present invention, wherein the switching and control unit is electrically connected to the sound quality sampling and encoding-decoding unit and the data access unit, and the switching and control unit is electrically connected to a device function switching unit, and functions can be switched between sound source mode capable of connecting to the sound quality sampling and encoding-decoding unit or memory reading mode capable of connecting to the data access unit through the device function switching unit.

According to one embodiment of the recording device of the present invention, wherein the data access unit is electrically connected to the switching and control unit, the memory unit is electrically connected to the switching and control unit via the data access unit, and the data access unit reads the first digital audio signal and the second digital audio signal or the converted digital data in the memory unit.

According to one embodiment of the recording device of the present invention, wherein the data writing unit is electrically connected with a warning component, a notification of data writing is sent out at the same time as the data is written, and a warning signal such as in forms of a light signal and sound are sent out when the memory unit is abnormal.

According to one embodiment of the recording device of the present invention, wherein the first transmission unit and the second transmission unit are wired or wireless transmission units.

According to one embodiment of the recording device of the present invention, wherein the electronic device is a device such as mobile phone, tablet computer, laptop or computer capable of transmitting audio and capable of electrically connecting to the first transmission unit.

According to one embodiment of the recording device of the present invention, wherein the audio receiving and transmitting device is a device such as earphone, Bluetooth earphone or speaker capable of transmitting and receiving audio and electrically connected to the second transmission unit.

According to one embodiment of the recording device of the present invention, further includes an audio switching unit, the audio switching unit is electrically connected to the second transmission unit and the audio receiving and transmitting device, and the audio receiving and transmitting device is electrically connected to the second transmission unit via the audio switching unit.

According to one embodiment of the recording device of the present invention, further includes an audio receiving and transmitting unit, the audio receiving and transmitting unit is electrically connected to the audio switching unit, and the audio receiving and transmitting unit is electrically connected to the second transmission unit via the audio switching unit. The sound quality sampling and encoding-decoding unit transmits the first analog audio source signal to the audio receiving and transmitting unit via the second transmission unit, and the audio receiving and transmitting unit is capable of generating the second analog audio source signal to be transmitted to the sound quality sampling and encoding-decoding unit.

DETAILED DESCRIPTION OF THE INVENTION

The above objects of the present invention, as well as its structural and functional features, will be described in accordance with the preferred embodiments of the drawings.

Figure 1:
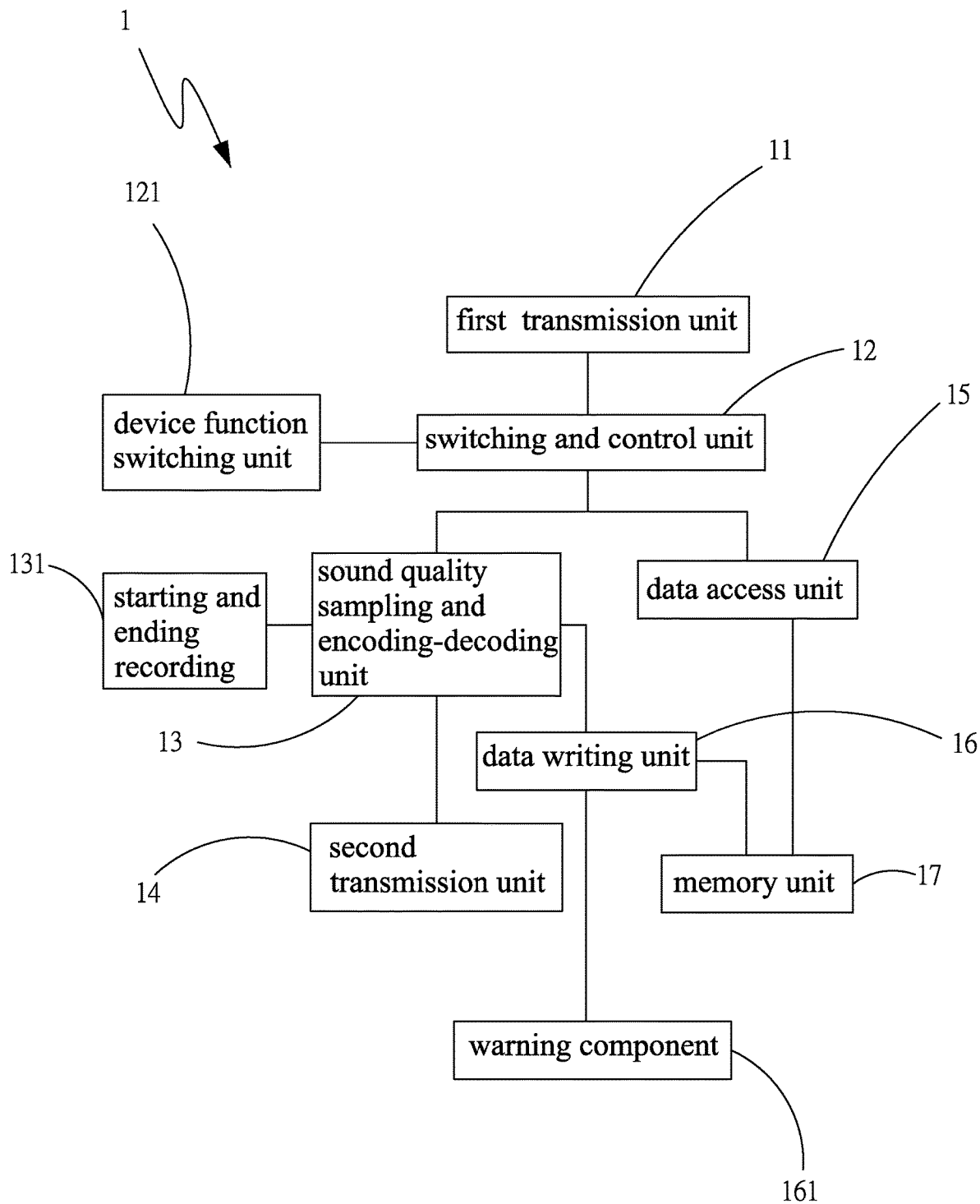
FIG. 1 is a block diagram of a recording device according to a preferred embodiment of the present invention.
Figure 2:
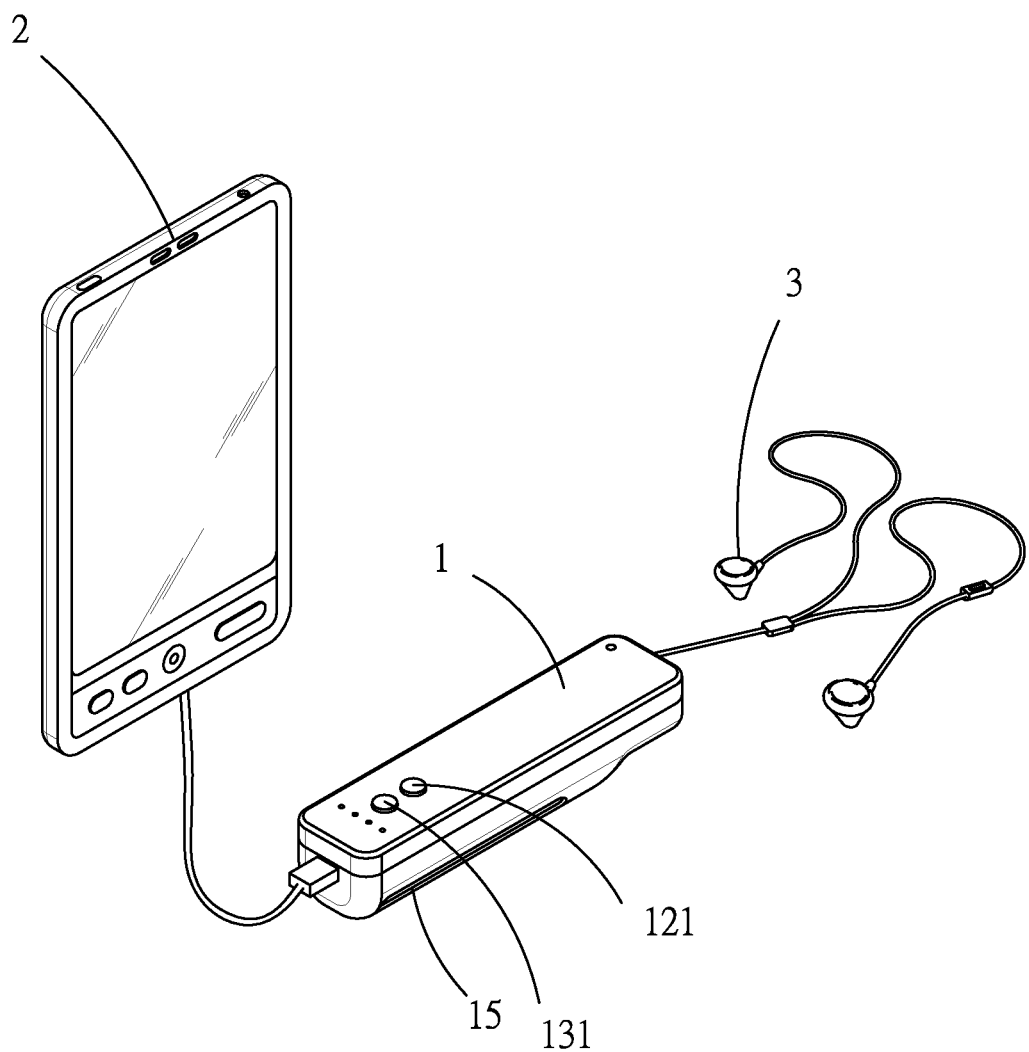
FIG. 2 is a first perspective view of a preferred embodiment of the present invention.
Figure 3:
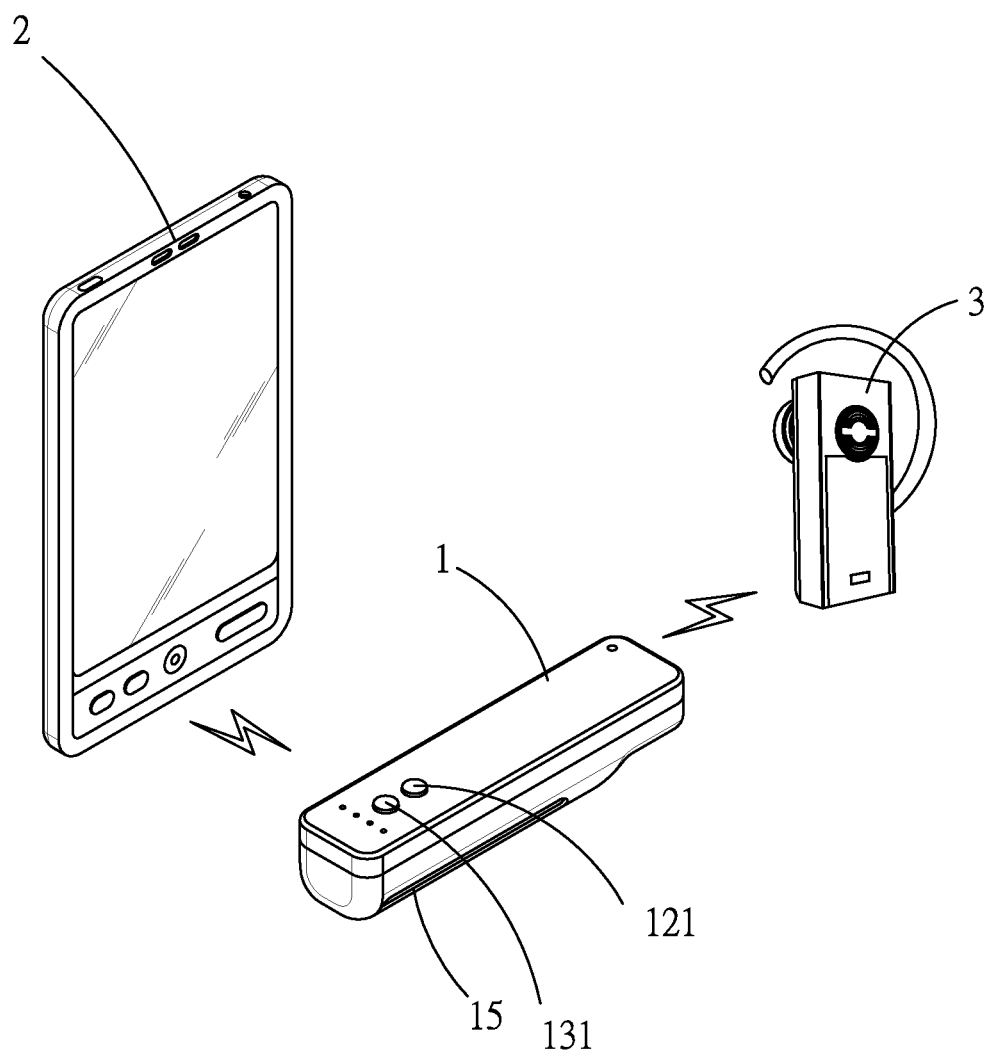
FIG. 3 is a second perspective view of a preferred embodiment of the present invention.

Please refer to FIG. 1 to FIG. 3, which are respectively block diagram, first perspective view and second perspective view of a recording device according to a preferred embodiment of the present invention. It can be clearly seen from the figures that a recording device 1 includes a first transmission unit 11, a switching and control unit 12, a sound quality sampling and encoding-decoding unit 13, a second transmission unit 14, a data access unit 15, a data writing unit 16 and a memory unit 17. The first transmission unit 11 is a wired or wireless transmission unit, the first transmission unit 11 is electrically connected to at least one electronic device 2, and the electronic device 2 can be a device such as mobile phone, tablet computer, laptop or computer capable of transmitting audio and capable of electrically connecting to the first transmission unit 11. The first transmission unit 11 is a wired or wireless transmission unit, digital signal transmitted by wire is USB Audio serial bus digital audio source signal, audio source signal of wireless transmission is Bluetooth Audio Profile digital audio source signal, the wired transmission unit can be a digital signal transmission interface such as USB, Type-C or Lightning, and the wireless transmission unit can be a wireless transmission interface such as WIFI, FM or Bluetooth. In this embodiment, Bluetooth is used as the main implementation mode, but is not limited thereto. The second transmission unit 14 is electrically connected to at least one audio receiving and transmitting device 3, and the audio receiving and transmitting device 3 can be a device such as earphone, Bluetooth earphone, speaker or in-car Bluetooth capable of transmitting and receiving audio and electrically connected to the second transmission unit 14. The second transmission unit 14 is a wired or wireless audio source signal transmission, the wired transmission is analog audio source signal, and the wireless transmission unit can be a wireless transmission interface such as WIFI, FM or Bluetooth. In this embodiment, the wireless transmission is Bluetooth Audio Profile digital audio source signal.

Wherein the switching and control unit 12 is electrically connected to the first transmission unit 11, the sound quality sampling and encoding-decoding unit 13 and the data access unit 15. The switching and control unit 12 is electrically connected to a device function switching unit 121. The switching and control unit 12, the sound quality sampling and encoding-decoding unit 13, the data writing unit 16 and the data access unit 15 can be separate chip units or integrated into one integrated circuit or system single-chip SoC unit.

The sound quality sampling and encoding-decoding unit 13 is electrically connected to the switching and control unit 12, the second transmission unit 14 and the data writing unit 16, and the sound quality sampling and encoding-decoding unit 13 is electrically connected with a switch for starting and ending recording 131.

The memory unit 17 is electrically connected to the data access unit 15 and the data writing unit 16. The data writing unit 16 is electrically connected with a warning component 161, and the memory unit 17 can be built in the recording device 1, or a storage element such as an SD card externally connected to the recording device 1.

Figure 4:
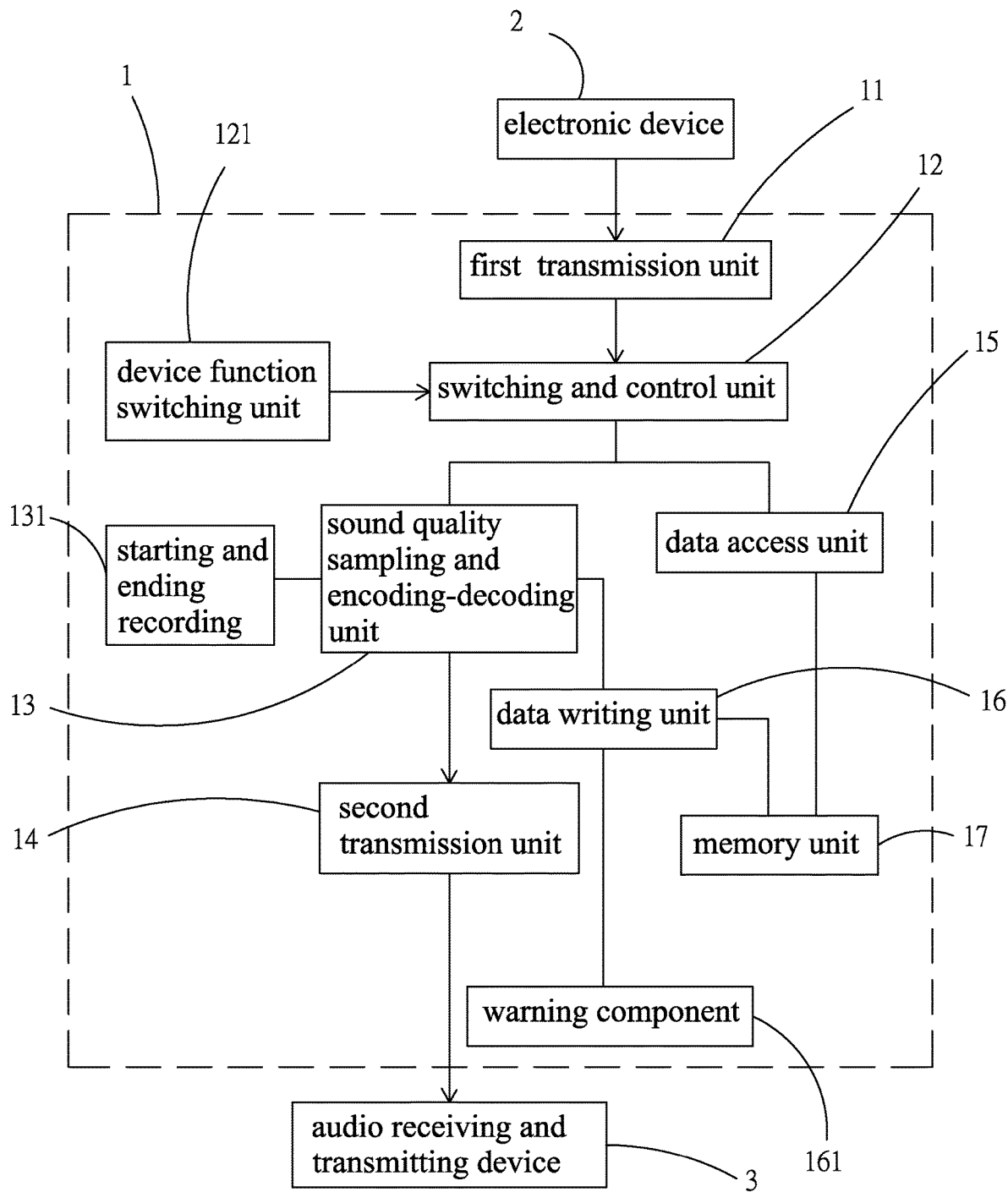
FIG. 4 is a first block diagram of a preferred embodiment of the present invention.
Figure 5:
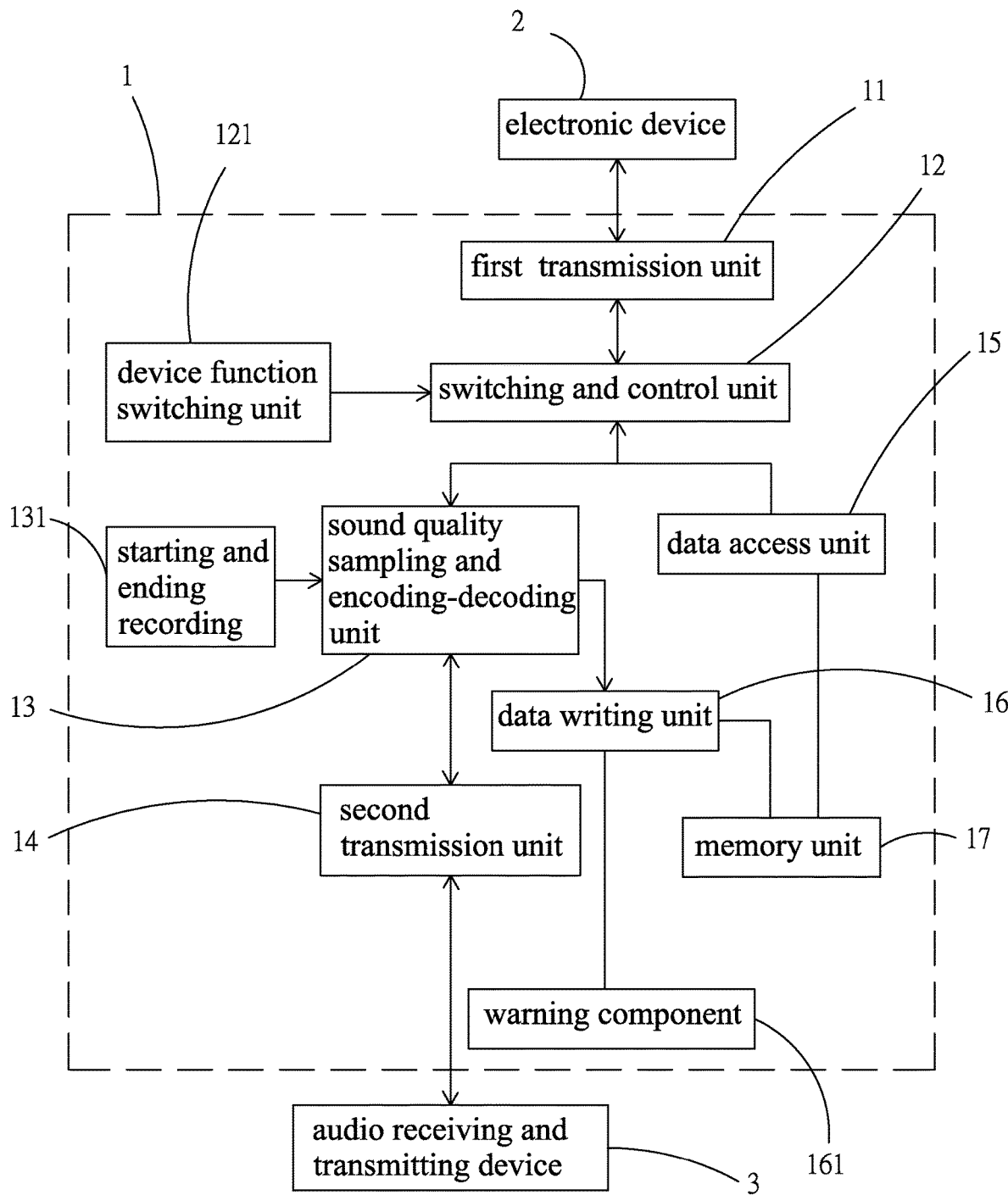
FIG. 5 is a second block diagram of a preferred embodiment of the present invention.

Please refer to the foregoing drawings and FIG. 4 and FIG. 5, which are first block diagram and second block diagram of a preferred embodiment of the present invention. When a user uses the recording device 1, the first transmission unit 11 can be connected with the electronic device 2 by wire or wirelessly, calling is performed through the audio receiving and transmitting device 3 connected to the electronic device 2, and can be selected as audio source conversion output mode or memory reading mode (OTG/CARD READER mode) by control of the device function switching unit 121; in the present embodiment, the audio source conversion output mode is selected. A call audio sent out by the electronic device 2 is a first digital audio source signal (the wired connection mode is USB Audio serial bus digital audio source signal, and the wireless connection mode is Bluetooth Audio Profile digital audio source signal) transmitted to the first transmission unit 11. The first transmission unit 11 receives the first digital audio source signal (the wired connection mode is USB Audio serial bus digital audio source signal, and the wireless connection mode is Bluetooth Audio Profile digital audio source signal), and then transmits the first digital audio source signal to the sound quality sampling and encoding-decoding unit 13. The second transmission unit 14 receives a second analog audio source signal and transmits the second analog audio source signal to the sound quality sampling and encoding-decoding unit 13. The sound quality sampling and encoding-decoding unit 13 samples sound quality of the first digital audio source signal (the wired connection mode is USB Audio serial bus digital audio source signal, and the wireless connection mode is Bluetooth Audio Profile digital audio source signal) and the second analog audio source signal, and capable of effectively avoiding distortion and producing high-resolution sound quality. The sound quality sampling and encoding-decoding unit 13 converts the sampled first digital audio source signal (the wired connection mode is USB Audio serial bus digital audio source signal, and the wireless connection mode is Bluetooth Audio Profile digital audio source signal) into a first digital audio signal (I2S signal) and a first analog audio source signal, and converts the second analog audio source signal into a second digital audio signal (I2S signal) and a second digital audio source signal (the wired connection mode is USB Audio serial bus digital audio source signal, and the wireless connection mode is Bluetooth Audio Profile digital audio source signal). At this time, the user can turn on or off a recording function by control of the switch for starting and ending recording 131. If the user has not turned on the recording function, it is generally audio source conversion output mode. When the switch for starting and ending recording 131 is detected to be turned on to start the recording function, the sound quality sampling and encoding-decoding unit 13 transmits the converted first digital audio signal (I2S signal) and the second digital audio signal (I2S signal) to the data writing unit 16. The data writing unit 16 merges the first digital audio signal (I2S signal) and the second digital audio signal (I2S signal) into a digital data to be stored in the memory unit 17. Until the switch for starting and ending recording 131 sends out a message of ending recording, a recording storage function of the recording device 1 can be directly completed without having to separately develop an application for network communication application to be installed on the electronic device 2, which can achieve an efficacy of saving resources for developing application programs. Wherein at the same time when the data writing unit 16 receives the first digital audio signal and the second digital audio signal, the warning component 161 generates a warning signal such as a warning sound or a warning light to inform that recording is in progress.

When the recording device 1 switches to the general audio source conversion output mode for calling, the sound quality sampling and encoding-decoding unit 13 transmits the first analog audio source signal converted from the first digital audio source signal (the wired connection mode is USB Audio serial bus digital audio source signal, and the wireless connection mode is Bluetooth Audio Profile digital audio source signal) to the second transmission unit 14, and the second transmission unit 14 transmits the first analog audio source signal to the audio receiving and transmitting device 3. In contrast, if the user generates a second analog audio source signal with the audio receiving and transmitting device 3, the second analog audio source signal is transmitted to the sound quality sampling and encoding-decoding unit 13 via the second transmission unit 14. The sound quality sampling and encoding-decoding unit 13 converts the second analog audio source signal into the second digital audio source signal (the wired connection mode is USB Audio serial bus digital audio source signal, and the wireless connection mode is Bluetooth Audio Profile digital audio source signal) and transmits the second digital audio source signal to the first transmission unit 11, and then transmits the second digital audio source signal to the electronic device 2 via the first transmission unit 11. Thereby the user can achieve an object of calling through the audio receiving and transmitting device 3 and the recording device 1.

Figure 6:
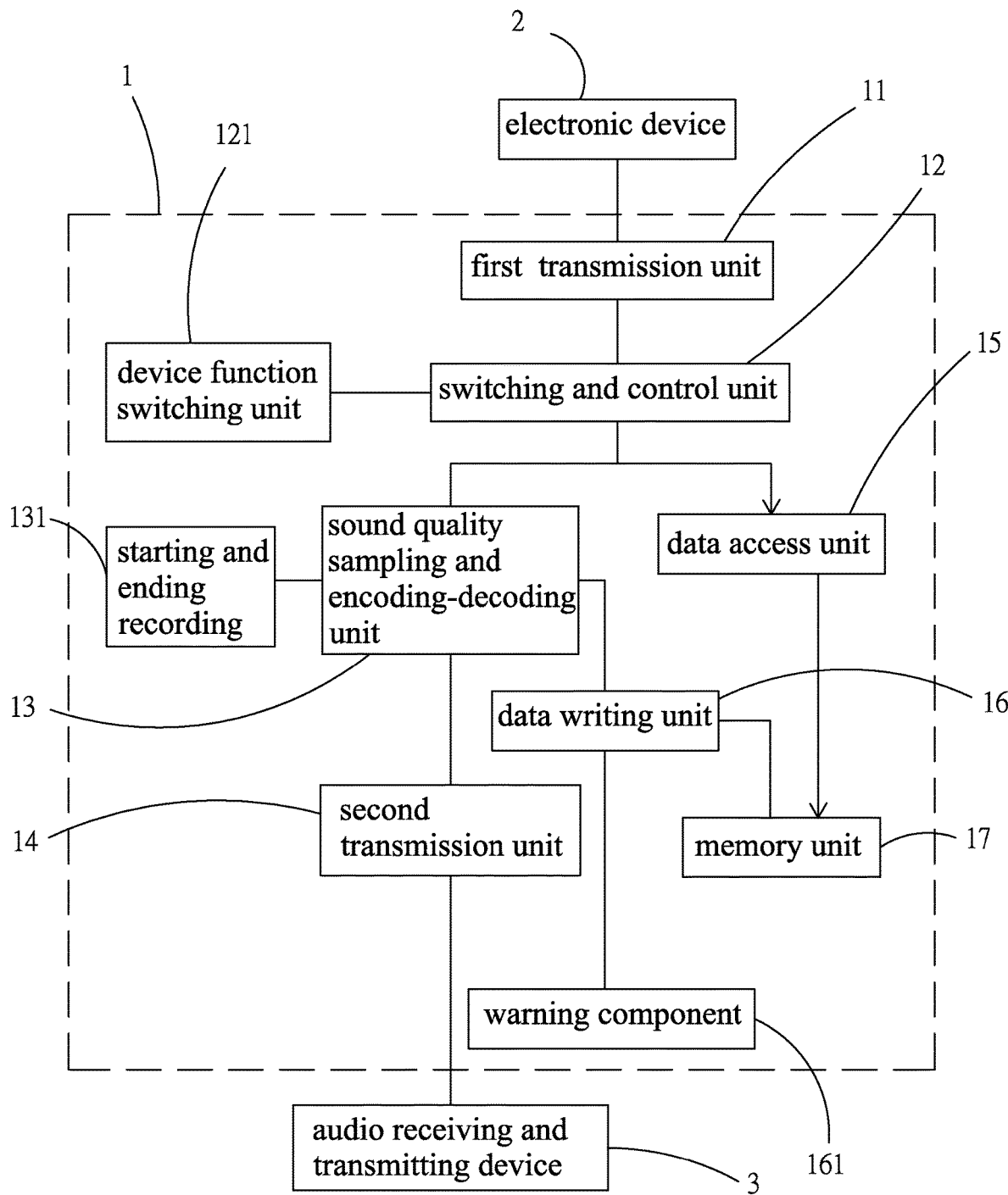
FIG. 6 is a third block diagram of a preferred embodiment of the present invention.

Please refer to the foregoing drawings and FIG. 6, FIG. 6 is a third block diagram of a preferred embodiment of the present invention. The user can select audio source conversion output mode or memory reading mode through control of the device function switching unit 121; in the present embodiment, the memory reading mode (OTG/CARD READER mode) is selected. The user can control the data access unit 15 to access stored data in the memory unit 17 via the electronic device 2. Thereby achieving efficacies of the recording device 1 capable of selecting recording or data accessing according to requirements and being convenient to carry. When the memory unit 17 of the recording device 1 is abnormal, the warning component 161 generates a warning signal, for example, a warning sound or warning light to inform the anomaly.

Figure 7:
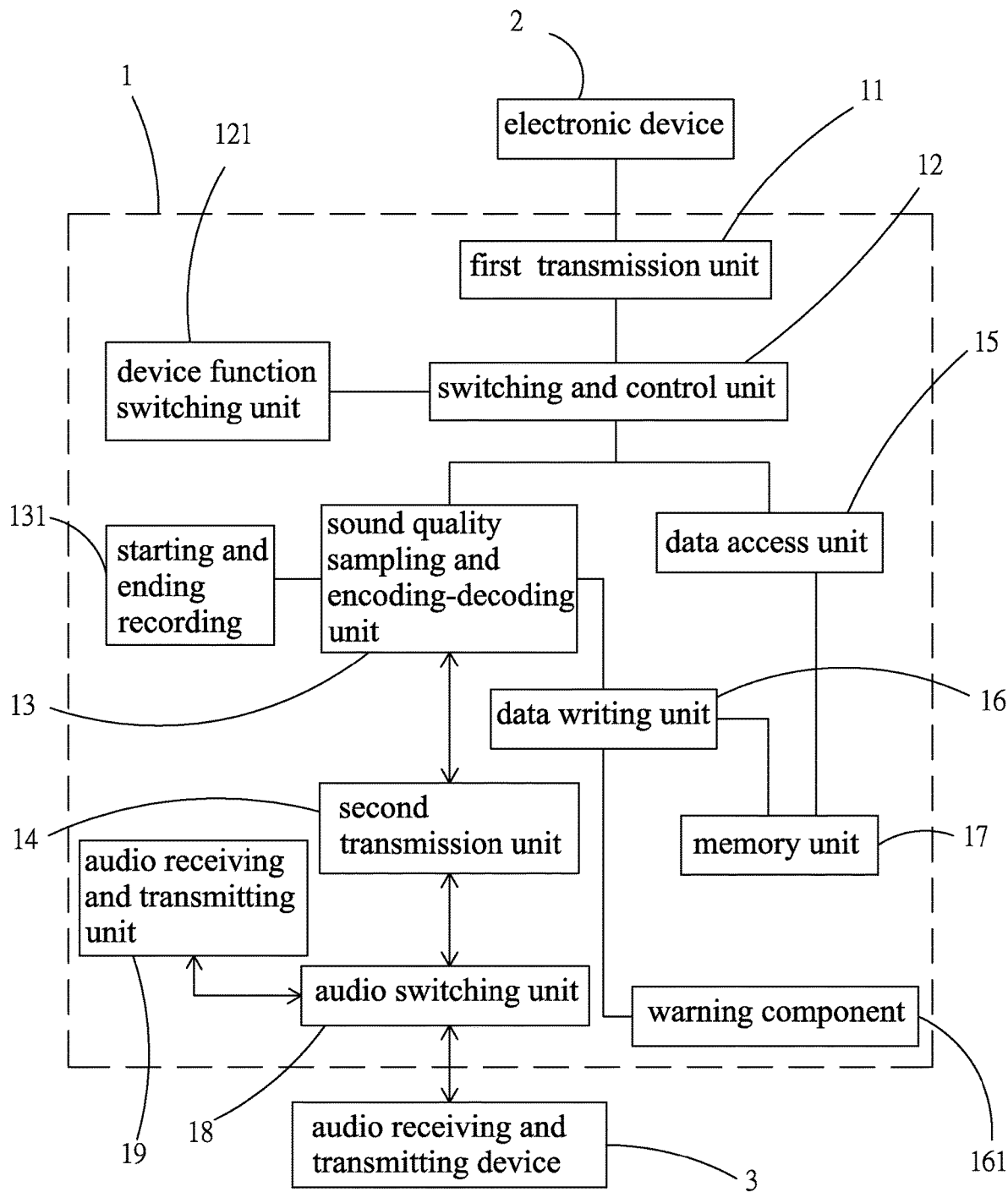
FIG. 7 is a fourth block diagram of a preferred embodiment of the present invention.
Figure 8:
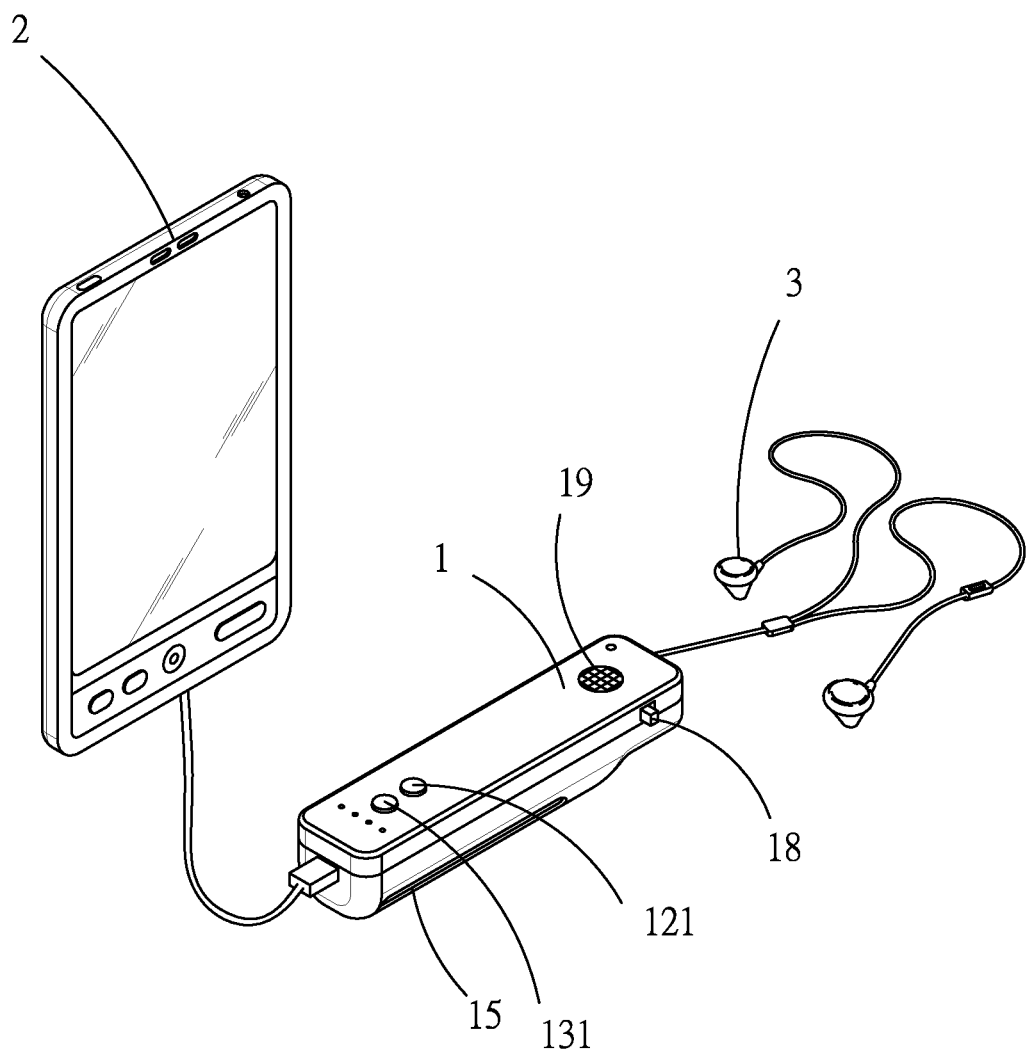
FIG. 8 is a third perspective view of a preferred embodiment of the present invention.
Figure 9:
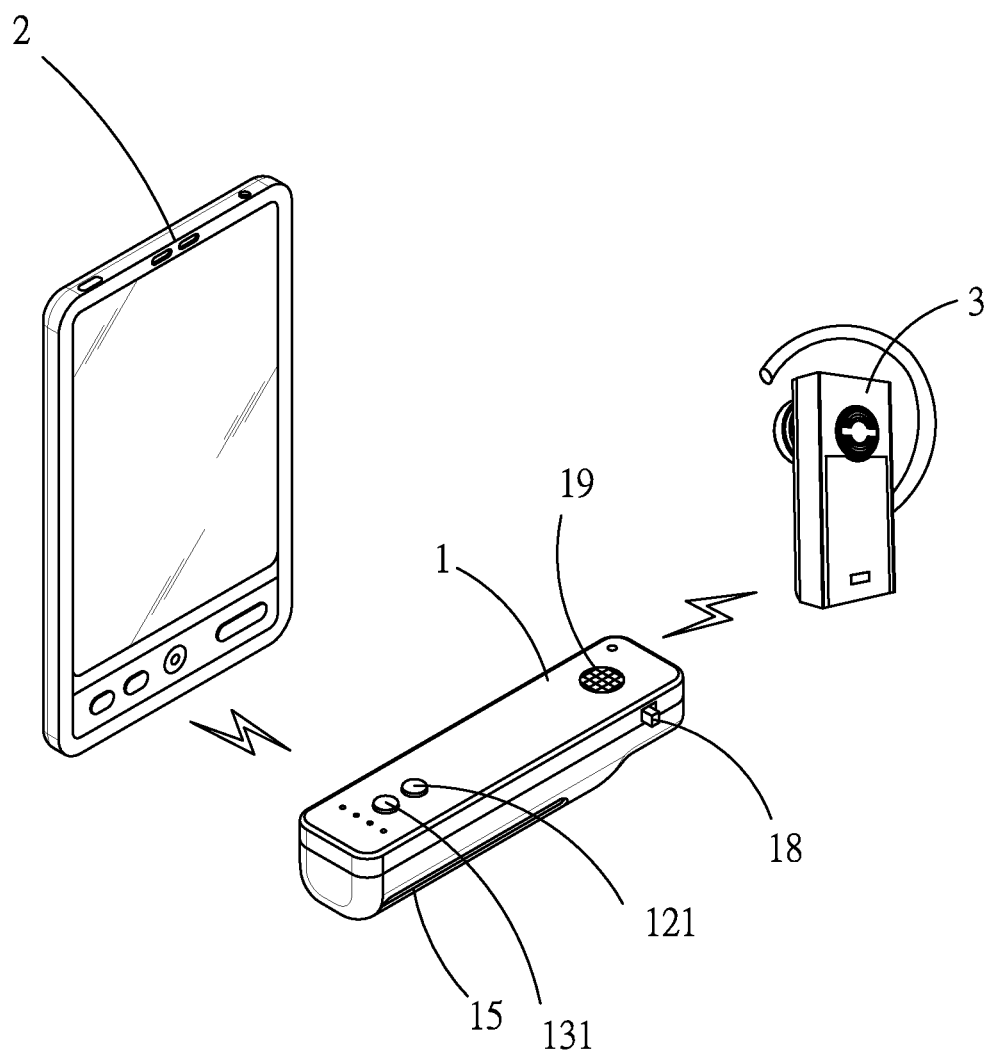
FIG. 9 is a fourth perspective view of a preferred embodiment of the present invention.

Please refer to the foregoing drawings and FIGS. 7, 8 and 9, which are respectively fourth block diagram, third perspective view and fourth perspective view of a preferred embodiment of the present invention. Wherein the recording device 1 further includes an audio switching unit 18 and an audio receiving and transmitting unit 19, and the audio switching unit 18 can be a physical switch or controlled by software or a sensing chip to implement switching function. In this embodiment, the audio switching unit 18 is implemented as a physical switch, and can also be controlled by a software of the recording device 1 of the present invention, or can be switched by sensing whether the audio receiving and transmitting device 3 is conducted or not, but it is not limited thereto. The audio switching unit 18 is mainly for switching to use the audio receiving and transmitting unit 19 or the audio receiving and transmitting device 3, the audio switching unit 18 is electrically connected to the second transmission unit 14 and the audio receiving and transmitting device 3, and the audio receiving and transmitting unit 19 is electrically connected to the second transmission unit 14 via the audio switching unit 18. The use of the audio receiving and transmitting device 3 or the audio receiving and transmitting unit 19 is controlled and switched by the audio switching unit 18. When the audio switching unit 18 switches to use the audio receiving and transmitting device 3, the first analog audio source signal of the second transmission unit 14 is transmitted to the audio receiving and transmitting device 3. The second analog audio source signal generated by the audio receiving and transmitting device 3 is transmitted to the sound quality sampling and encoding-decoding unit 13 via the second transmission unit 14, thereby reaching the user and achieving an object of call through the audio receiving and transmitting device 3 and the recording device 1. In contrast, when the audio switching unit 18 switches to use the audio receiving and transmitting unit 19, the sound quality sampling and encoding-decoding unit 13 transmits the first analog audio source signal to the audio receiving and transmitting unit 19 via the second transmission unit 14, and the second analog audio source signal generated by the audio receiving and transmitting unit 19 is transmitted to the sound quality sampling and encoding-decoding unit 13 via the second transmission unit 14, thereby the user can achieve an object of call through the audio receiving and transmitting unit 19 and the recording device 1. Wherein the second transmission unit 14 is a wired or wireless transmission unit, digital signal transmitted by wire is USB Audio serial bus digital audio source signal, the wired transmission unit can be a digital signal transmission interface such as USB, Type-C or Lightning, and the wireless transmission unit can be a wireless transmission interface such as WIFI, FM or Bluetooth. In this embodiment, Bluetooth is used as the main implementation mode, and audio source signal of wireless transmission is Bluetooth Audio Profile digital audio source signal.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:
1. A recording device, comprising:
a first transmission unit, the first transmission unit being connected to at least one electronic device, the electronic device generating at least one first digital audio source signal;
a switching and control unit, the switching and control unit being electrically connected to the first transmission unit and receiving the first digital audio source signal, and the switching and control unit is electrically connected with a device function switching unit capable of alternate switching of audio source conversion output mode or memory reading mode (OTG/CARD READER mode);
a sound quality sampling and encoding-decoding unit, the sound quality sampling and encoding-decoding unit being electrically connected to the switching and control unit and receiving the first digital audio source signal and converting the first digital audio source signal into a first digital audio signal (I2S signal) and a first analog audio source signal, the sound quality sampling and encoding-decoding unit transmitting the first analog audio source signal to an audio receiving and transmitting device via a second transmission unit, the audio receiving and transmitting device being capable of generating a second analog audio source signal to be transmitted to the sound quality sampling and encoding-decoding unit, the sound quality sampling and encoding-decoding unit converting the second analog audio source signal into a second digital audio source signal and a second digital audio signal (I2S signal), and the sound quality sampling and encoding-decoding unit transmitting the second digital audio source signal to the electronic device via the switching and control unit and the first transmission unit;
a second transmission unit, the second transmission unit being electrically connected to the sound quality sampling and encoding-decoding unit and the audio receiving and transmitting device, and the second transmission unit receiving and transmitting the first analog audio source signal and the second analog audio source signal;
a data access unit, the data access unit being electrically connected to the switching and control unit and a memory unit;
a data writing unit, the data writing unit being electrically connected to the sound quality sampling and encoding-decoding unit and the memory unit, the data writing unit receiving the first digital audio signal and the second digital audio signal and storing the first digital audio signal and the second digital audio signal to the memory unit;

a memory unit, the memory unit being electrically connected to the data access unit and the data writing unit, the data writing unit performing storing on the memory unit, and the data access unit being capable of accessing data in the memory unit; and a switch for starting and ending recording, the switch for starting and ending recording being electrically connected to the sound quality sampling and encoding-decoding unit capable of controlling the first digital audio signal and the second digital audio signal to start storing or end storing in the memory unit.

2. The recording device as claimed in claim 1, wherein the data access unit is electrically connected to the switching and control unit and the memory unit, and the data access unit is capable of accessing data in the memory unit.

3. The recording device as claimed in claim 1, wherein the data writing unit is electrically connected with a warning component, a notification of data writing is sent out at the same time as the data is written, and a warning signal such as a warning light and a warning sound are sent out when the memory unit is abnormal.

4. The recording device as claimed in claim 1, wherein the first transmission unit and the second transmission unit are wired or wireless transmission units.

5. The recording device as claimed in claim 4, wherein when the first transmission unit and the second transmission unit are connected in a wired manner, the first digital audio source signal and the second digital audio source signal are USB Audio serial bus digital audio source signals, and when are connected in a wireless manner, the wireless transmission units can be wireless transmission interfaces such as WIFI, FM or Bluetooth.

6. The recording device as claimed in claim 1, wherein the first digital audio signal and the second digital audio signal are I2S signals.

7. The recording device as claimed in claim 1, wherein the electronic device is a device such as mobile phone, tablet computer, laptop or computer capable of transmitting audio and capable of electrically connecting to the first transmission unit.

8. The recording device as claimed in claim 1, wherein the audio receiving and transmitting device is a device such as earphone, Bluetooth earphone, speaker or in-car Bluetooth capable of transmitting and receiving audio and electrically connected to the second transmission unit.

9. The recording device as claimed in claim 1, further comprising an audio switching unit, the audio switching unit being electrically connected to the second transmission unit and the audio receiving and transmitting device, and the audio receiving and transmitting device being electrically connected to the second transmission unit via the audio switching unit.

10. The recording device as claimed in claim 9, further comprising an audio receiving and transmitting unit, the audio receiving and transmitting unit being electrically connected to the audio switching unit, the audio receiving and transmitting unit being electrically connected to the second transmission unit via the audio switching unit, the sound quality sampling and encoding-decoding unit transmitting the first analog audio source signal to the audio receiving and transmitting unit via the second transmission unit, and the audio receiving and transmitting unit being capable of generating a second analog audio source signal to be transmitted to the sound quality sampling and encoding-decoding unit.

* * * * *